United States Patent [19]

Neihoff et al.

[11] Patent Number: 4,884,355
[45] Date of Patent: Dec. 5, 1989

[54] FISHING BOBBER WITH SIGNAL LIGHT

[76] Inventors: Randall L. Neihoff, 613 Cypress Cir., P.O. Box 1091, Calvert City, Ky. 42029; Hugh R. Drewry, Jr., 3000 Knight Rd., Memphis, Tenn. 38118

[21] Appl. No.: 275,944

[22] Filed: Nov. 25, 1988

[51] Int. Cl.$^4$ .............................................. A01K 93/00
[52] U.S. Cl. .......................................... 43/17; 43/17.5
[58] Field of Search .................... 43/17.5, 44.87, 17.1, 43/17

[56] References Cited

U.S. PATENT DOCUMENTS

| | | | |
|---|---|---|---|
| 3,292,294 | 12/1966 | Beach et al. | 43/17.5 |
| 4,461,114 | 7/1984 | Riead | 43/17.5 |
| 4,748,761 | 6/1988 | Machouina | 43/17.5 |

Primary Examiner—Nicholas P. Godici
Assistant Examiner—Michael William Starkweather
Attorney, Agent, or Firm—Warren D. Flackbert

[57] ABSTRACT

A fishing bobber in the form of a floatable container or jug and including a visual signal selectively actuated upon the taking of a baited hook on a line by a fish. The bobber contains a power source and circuitry including an electrically conductive plunger operable by fishing line movement.

3 Claims, 1 Drawing Sheet

U.S. Patent
Dec. 5, 1989
4,884,355
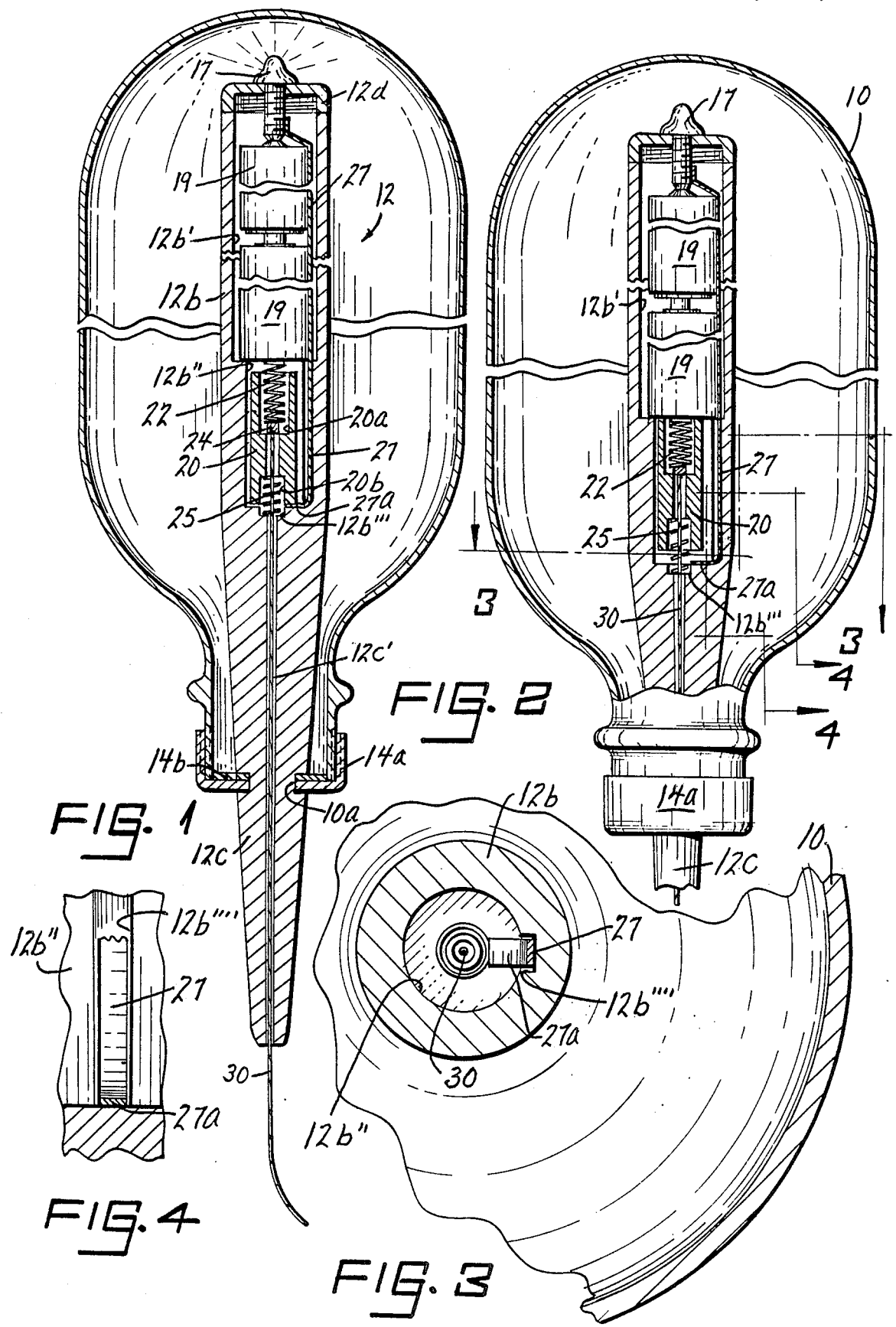

FISHING BOBBER WITH SIGNAL LIGHT

As is known, fishing, in various bodies of water, generates widespread and continuing interest. One area which requires particular recognition by the fisherman, particularly at night time, is the engagement of the fishhook by the fish and the need for the immediate setting of the hook. The invention presents a fishing bobber which instantly and visually draws the fisherman's attention to a hooked fish, such being in the form of a floatable container or a jug within which a minimum number of components cooperate to achieve the desired signalling objective.

BACKGROUND OF THE INVENTION

More specifically, the aforesaid container or jug receives batteries, combined in series, which operate a signal light upon movement of a plunger responsive to the hooking of a fish. In other words, the plunger, maintained in a first non-operative position by a spring, is moved to a second or operative position against such spring and by reason of force exerted on the line by the fish.

When the plunger is at the second or operative position, a light within the container or jug is energized, causing a visual signal for the fisherman to, thereafter, proceed in the usual catching sequence. The aforesaid container or jug is watertight and floatable, being partially submerged when in use in connection with a fishing line.

BRIEF DESCRIPTION OF THE FIGURES

In any event, a better understanding of the present invention will become more apparent from the following description, taken in conjunction with the accompanying drawing, wherein FIG. 1 is a view in elevation showing a fishing bobber in accordance with the teachings of the present invention in use and at an operative condition;

FIG. 2 is another view in side elevation of the instant fishing bobber, showing such, however, in use at a non-operative position;

FIG. 3 is a view in horizontal section, taken at line 3—3 on FIG. 2 and looking in the direction of the arrows, detailing representative electrical contact circuitry; and, FIG. 4 is a view in front elevation, in this instance taken at line 4—4 of FIG. 2 and looking in the direction of the arrows, still further detailing the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the fishing bobber of the invention typically combines a container or jug 10 which receives a body 12 including a constant sized diameter portion 12b blending into a tapered end 12c, where the latter extends through an opening 10a to the container or jug 10. In order to preserve a watertight property, a cap 14a-gasket 14b assembly is provided at the opening 10a to the container or jug 10.

The body portion 12b includes internal cavities 12b', 12b" and 12b''', emptying into a passageway 12c' through which a single line 30 from an electrically conductive plunger 20 extends, i.e. in a path of travel ultimately including a fisherman's reel and the baited fishhook (both of which are not shown). An end of cavity 12b' includes a threaded closure 12d through which a lamp 17 extends and operatively engages series arranged dry cell batteries 19. The aforesaid batteries 19 are stationary and retained in position on an internal ledge adjoining cavities 12b' and 12b".

Cavity 12b" serves to receive the electrically conductive plunger 20 having a cut-out or recess 20a-20b at each end thereof. Recess 20a receives a spring 22 which extends between an immediately adjacent battery 19 and a contact plate 24 to which the fishing line 30 is secured. On the other hand, recess 20b receives a spring 25 which is seated in cavity 12b'''.

As will be particularly evident in FIGS. 1 and 2, a conductive strip 27 extends between the base of the lamp 17, along the internal cavities 12b' and 12b" of the body portion 12b and terminates at an inwardly extending tab 27a at the bottom of cavity 12b".

When the plunger 20 moves downwardly as a result of a fish movement, i.e. from the normal inoperative position of FIG. 2 to the operative position of FIG. 1, electrical circuitry is completed to the lamp 17 in a path including the electrically conductive strip 27, the electrically conductive plunger 20, spring 22, and batteries 19. At this time, the fisherman is aware of the presence of the fish and can do whatever is appropriate to complete the fishing procedure.

As a matter of detail, it should be noted that the conductive strip 27 does not make positive electrical engagement with the sides of the batteries 19 because of the insulative coverings on the latter. Moreover, the conductive strip 27 also makes no side contact with the plunger 20 because, in a preferred arrangement, of the placement thereof within a notch 12b'''' extending along a portion of cavity 12b" in the body portion 12b. Electrical contact between the plunger 20 and conductive strip 27 is accomplished at the tab 27a (as depicted in FIG. 1).

It should be evident, therefore, that the fishing bobber presented by the invention represents a practical solution to readily identify the presence of a fish on a baited hook. The mere engagement of the hook by the fish causes plunger 20 movement and, hence, the completion of the electrical circuit which includes the lamp or visual indicator 17. The instant bobber, therefore, achieves a utilitarian purpose not heretofore known by fishermen.

The fishing bobber described hereabove is susceptible to various changes within the spirit of the invention, including, by way of example, in proportioning; the overall configuration of the internal mechanism; the manner in which the electrically conductive strip extends from the lamp, without contact (when the plunger is moved by fish action) to an engagement position with the tab thereof; the number of batteries employed; the configuration of the container or jug; and, the like. Thus, the preceding should be considered illustrative and not as limiting the scope of the following claims:

We claim:

1. A fishing bobber comprising a float shell including a cap end, a cap removably secure about said cap end, and a cylindrical body disposed within said float shell and extending through a central hole of said cap, wherein cooperative means between said cylindrical body and said cap assure an assembled watertight relationship, said cylindrical body defined by a longitudinal passageway having a first portion including means at one end against which a power source is retained, a second portion receiving a longitudinally movable conductive plunger, and a third portion receiving resilient means normally urging said conductive plunger into a non-signaling condition, said conductive plunger receiving resilient means completing an electrical circuit with said power source and a light source, a conductive strip disposed within said longitudinal passageway and extending between said light source at one end thereof and into selective contact at an opposite end with said conductive plunger upon movement of the latter, and a line connected to said conductive plunger and extending through said cylindrical body at said cap end and selectively movable to electrically engage said conductive plunger with said conductive strip at a signaling condition.

2. The fishing bobber of claim 1 where said light source is secured onto a closure disposed at an opposite end of said first portion of said longitudinal passageway.

3. The fishing bobber of claim 1 where an insulative cover on said power source prevents electrical contact by said conductive strip.

* * * * *